July 29, 1952 E. H. HUGENHOLTZ 2,605,425

DEVICE FOR SYNCHRONIZING TWO OSCILLATIONS

Filed Nov. 22, 1946 2 SHEETS—SHEET 1

EDUARD HERMAN HUGENHOLTZ
INVENTOR.

BY [signature]

ATTORNEY.

DEVICE FOR SYNCHRONIZING TWO OSCILLATIONS

Filed Nov. 22, 1946 2 SHEETS—SHEET 2

EDUARD HERMAN HUGENHOLTZ
INVENTOR.

BY [signature]

ATTORNEY.

Patented July 29, 1952

2,605,425

UNITED STATES PATENT OFFICE 2,605,425

DEVICE FOR SYNCHRONIZING TWO OSCILLATIONS

Eduard Herman Hugenholtz, Eindhoven, Netherlands, assignor to Hartford National Bank and Trust Company, Hartford, Conn., as trustee Application November 22, 1946, Serial No. 711,692
In the Netherlands September 20, 1945

Section 1, Public Law 690, August 8, 1946
Patent expires September 20, 1965

4 Claims. (Cl. 250—36)

Figure 1:
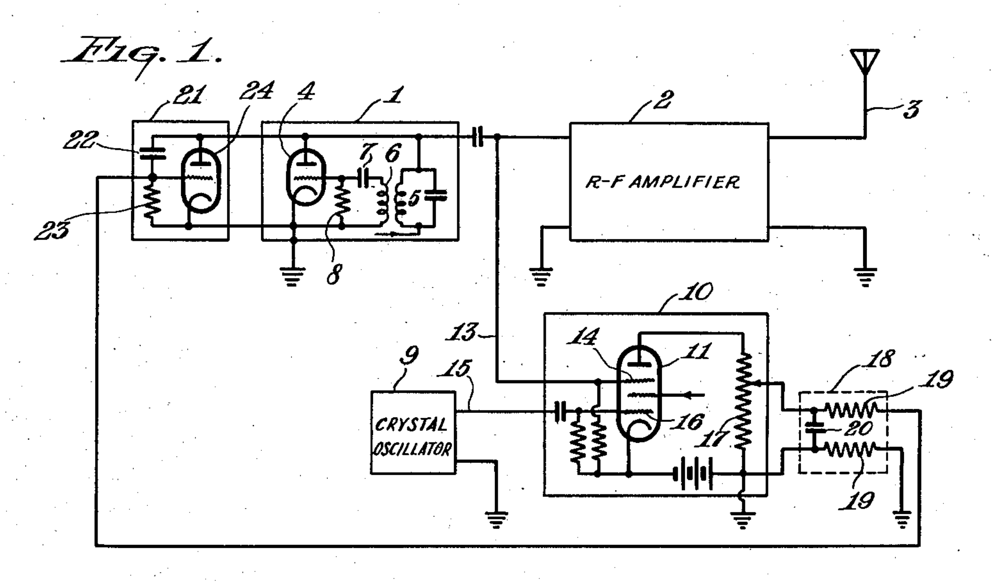

For several purposes it is of importance that the frequency of an oscillation derived from an oscillator should be controllable through a range of frequencies of at least 100 cycles/sec. by means of an automatically-operating control device, this control being effected as a function of the frequency of a control oscillation. Such a device has an important application in the transmission field.

In automatically-operating control devices already known for transmission purposes the aim is to obtain a constant frequency difference between the frequency of the oscillation generated by the transmitting oscillator and the frequency of a control oscillation. With the aid of a so-called absolute frequency-discriminator to which the difference frequency of the two oscillations is supplied, a direct control voltage is generated, the value of which is dependent on the deviation from the correct frequency difference between the two oscillations and the polarity of which indicates whether the difference frequency is higher or lower than the value desired. If the two oscillations exhibit the correct frequency difference, the direct voltage has in this case the value zero. The direct voltage thus obtained controls either by means of a motor one of the tuning elements of the transmitting oscillator, or a so-called reactance tube which is coupled with the tuning circuit of the oscillator.

The use of the described method of stabilisation of a transmitting oscillator affords the advantage that in each transmitter a comparatively small number of amplifying stages between the transmitting oscillator and the aerial suffices. If, for example, for generating a transmission power of 500 watts use is made of a crystal-controlled oscillator from which 0.1 watt only can be derived, a 5000-fold amplification of energy is required, for which purpose a large number of amplifying stages is necessary. In stabilising the transmitting oscillator by means of a governing oscillation it is possible to use a transmitting oscillator having an output of 500 watts and to derive the governing oscillation from a crystal-controlled oscillator having an output of 0.1 watt. In this case a single blocking stage between the transmitting oscillator and the aerial is sufficient. The suppression of the energy-amplifying stages is particularly advantageous in the case of transmitters having a variable transmitting freqency, since the relative exact tuning of these stages meets with material difficulties in practice due to the increasing power of each transmitting stage.

The aforesaid automatically-operating control device has, however, the drawback that the correct frequency difference is not exactly attainable, since the control voltage is zero at this frequency difference.

Furthermore an automatically-operating control device has been proposed in which the aim is to obtain accordance of frequency (synchronism) between the frequency of the oscillations to be controlled and the frequency of a governing oscillation. The object aimed at is realized in this case by taking off from the frequency differences between the two oscillations a direct voltage, the value and polarity of which are dependent upon the value and the polarity of the frequency difference. This direct voltage controls a motor, with the aid of which the oscillator frequency may be brought in accordance with the frequency of the governing oscillator with an accuracy up to a few cycles per second. In this case the remaining frequency difference is reduced to zero by supplying the two oscillations to a mixing circuit, the output voltage of which controls a reactance tube connection which is coupled with the oscillatory circuit and the control range of which is proportioned in accordance with the remaining frequency difference of 1 to 2 C./S. to be corrected. This device permits of obtaining complete accordance between the frequencies of the two oscillations but has the drawback that frequency correction of, for example, 100 C./S. is effected only after about 1 to 2 seconds; a higher frequency difference requires a time which is correspondingly longer.

The object of the invention is to provide a simple and quick-acting automatic control device which permits of controlling the frequency of an oscillator through a comparatively large frequency range (of about 100 C./S. or larger) until precise accordance, that is to say synchronism, with the frequency of a governing oscillation is obtained.

According to the invention, the control device comprises a mixing circuit which is controlled by the two oscillations and which furnishes, in addition to difference frequencies, in the case of synchronism of the supplied oscillations, a direct voltage dependent on the phase difference, the control device furthermore comprising a device controlled by the output voltage of the mixing circuit and serving to modulate the frequency of the oscillations generated by the oscillator through a range of frequencies of at least 100 C./S., the time-constant of the control device being so small that a frequency of 100 C./S. can be corrected within a time which is smaller than one cycle of 100 C./S.

In "co-wave" transmitting systems, in which the same program is transmitted by a plurality of transmitters with the same frequency, it is required that between the different carrier-waves of equal frequency that are emitted there should be a definite phase relation and more particularly isochronism. It is known for this purpose to derive a governing oscillation from the carrier oscillations of one of the transmitters and to compare the said governing oscillation in each of the other transmitters with an oscillation of same frequency as the governing oscillation, which is derived from the carrier oscillation generated in the transmitters. In each of the transmitters the carrier-wave oscillator is so adjusted that the frequency of the oscillation derived therefrom either corresponds with the frequency of the governing oscillation, or differs therefrom by 1 to 2 C./S. at the most. In order to ensure isochronism between the oscillation obtained from the oscillator and the governing oscillation, use is made of an automatically-operating control device comprising a mixing circuit to which the two oscillations are supplied and, for example, a discharge tube controlled by the output voltage of the mixing circuit and coupled with the frequency-determining circuit of the carrier-wave oscillator. In this case the control range of the discharge tube is proportioned in accordance with the maximum frequency difference of 1 to 2 C./S. to be corrected.

The recognition of the fact that such a control device which serves for the isochronous control of two oscillations brought substantially in synchronism by a separate device (for example, manual control) is suitable, with correct proportioning of the control range of the discharge tube and a proper choice of the time-constant of the entire device in connection with this control range, for the synchronous control of two oscillations between which exists a comparatively large frequency difference (for example, a difference of 100, 500 or even 20,000 C./S.) is, however, not known therefrom.

In order that the invention may be clearly understood and readily carried into effect, it will now be described more fully with reference to the accompanying drawing.

Fig. 1 represents diagrammatically a transmitter in which use is made of a device according to the invention. This transmitter is constituted by an oscillator 1 in which the oscillations to be transmitted are generated, and one or two amplifying stages, in one of which the oscillations generated by the oscillator 1 are modulated by a signal to be transmitted. This part of the transmitter is represented by a rectangle 2. The oscillations generated by the oscillator 1 and modulated by the signal to be transmitted are irradiated by an aerial 3.

The oscillator 1 is constituted by a discharge tube 4, the anode circuit of which includes an oscillatory circuit 5, which is coupled with a coil 6 included in the grid circuit. A grid condenser 7 and a leak resistance 8 serve to obtain a suitable grid-bias.

For the stabilisation of the frequency of the oscillations generated by the transmitting oscillator 1 provision is made of a crystal-controlled oscillator 9 which generates oscillations having a frequency with which the frequency of the transmitting oscillator must be brought exactly in conformity. For this purpose the oscillations generated by transmitting oscillator 1 and by oscillator 9 are supplied to a mixing circuit 10 which comprises a multigrid tube 11 having a direct-current output circuit. The oscillations generated by transmitting oscillator 1 are supplied, via a conductor 13, to a grid 14 of multigrid tube 11, the governing oscillation generated by oscillator 9 being supplied, via a conductor 15, to a grid 16 of tube 11. The output circuit of tube 11 includes a non-tuned load impedance which allows the passage of direct current and is constituted by a resistance 17. The output voltage of the mixing circuit is supplied, if desired, through a low-pass filter 18 comprising two longitudinal resistances 19 and a transverse condenser 20, to a device 21 adapted for modulating the frequency of the oscillations generated by transmitting oscillator 1.

The frequency modulator 21 is constituted by a discharge tube 24 which is back-coupled so as to be wattless by means of a condenser 22 and a resistance 23 and which constitutes a reactance connected in parallel to the frequency-determining circuit 5 of the transmitting oscillator 1. The value of the reactance is in this case dependent on the voltage supplied to a control grid of the tube 24, said voltage being derived from the output resistance 17 of the mixing circuit.

The operation of the device described is the following:

If alternating voltages of different frequencies are supplied to the mixing circuit 10, there is set up at the output resistance 17 an alternating voltage having a frequency equal to the difference frequency between the governing voltage and the voltage of the transmitting oscillator. If the governing voltage and the voltage of the transmitting oscillator have equal frequencies, there is set up at the output resistance 17 a direct voltage, the value of which is dependent on the sense and value of the phase difference between the said voltages. With a phase displacement of 90° a mean output voltage is set up at output resistance 17.

The circuit-arrangement as described is stable if voltages having equal frequencies are supplied to the mixing circuit 10 with a phase difference such that the reactance circuit 21, by means of the direct voltage set up at the output resistance 17, compensates for the difference between the tuning frequency of circuit 5 of the transmitting oscillator and the frequency of the governing voltage. In this case the tuning frequency of the transmitting oscillator and the frequency of the governing voltage may exhibit a great frequency difference of, for example, 10,000 C./S., provided that the control range of the reactance circuit 21 is sufficiently large.

If, on switching in the arrangement shown, there is a frequency difference between the voltage of the transmitting oscillator and the governing voltage which can be adjusted within the control range of the reactance circuit 21, the aforesaid stable condition will automatically be reached, provided that the time-constant of the control circuit is sufficiently small, since if the time-constant of the control circuit exceeds one cycle of the frequency difference to be corrected, the voltage set up at the output resistance 17 of the mixing circuit and the frequency variations in the voltage of the transmitting oscillator exhibit a mutual phase displacement such that a continuous variation of the transmitting oscillator about the initial frequency ensues.

The time-constant of the control circuit and hence the maximum frequency difference capable of being corrected may, if desired, be limited in a simple manner by means of the low-pass filter 18. For frequency differences between the voltage of the transmitting oscillator and the governing voltage which exceed the limit frequency of the filter, the time-constant is so high that the frequency differences cannot be compensated.

Figure 2:
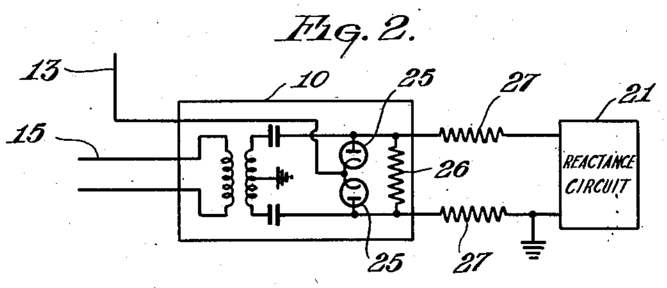

Fig. 2 shows a further form of the mixing circuit 10. This circuit comprises two diodes 25, to which the governing voltage is supplied in phase opposition through conductor 13, the oscillator voltage being supplied thereto in co-phase through conductor 15. This mixing circuit also exhibits the property that, if the voltages supplied differ in frequency, an alternating voltage having the difference frequency is set up at an output resistance 26, whereas in the case of synchronism there is set up at output resistance 26 a direct voltage which is dependent on the phase difference between the said voltages. The voltage across output resistance 26 is supplied to the reactance circuit 21 through resistances 27, which serve to block the alternating input voltages.

Figure 3:
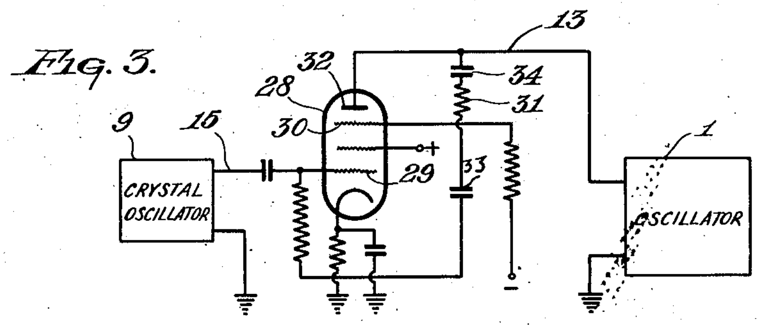

The circuit arrangement in Fig. 3 is a simplified form of that shown in Fig. 1. The simplification consists in the reactance circuit 21 being combined with the mixing circuit 10. In this case the mixing circuit is constituted by a multigrid tube 28, the governing voltage being supplied to the first grid 29, and the voltage of the transmitting oscillator being supplied to the third grid 30 through conductor 13 and a resistance 31, which is included between the anode 32 and the grid 30. Furthermore, a condenser 33 is included between the grid 30 and the cathode with the result that the cathode, grid 30 and anode 32 constitute a triode system back-coupled so as to be wattless, and which is connected in parallel to the tuning circuit of transmitting oscillator 1, since anode 30 is connected to conductor 13. The resistance 31 has connected in series with it a condenser 34 which fulfills the function of a blocking condenser. This circuit arrangement operates similarly to that of Fig. 1.

Figures 4, 5:
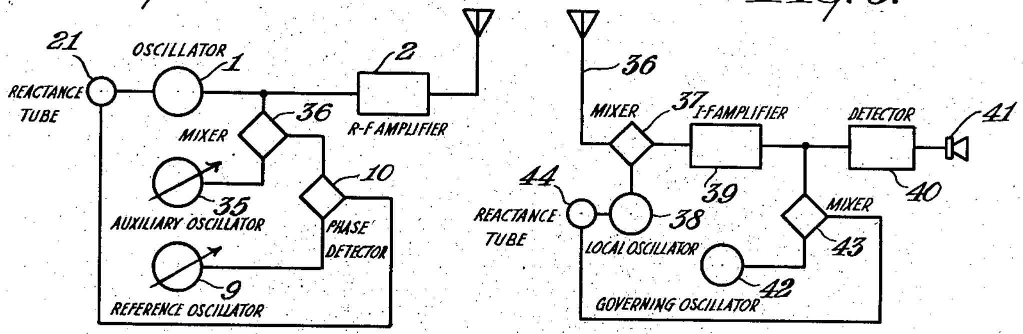
Figure 6:
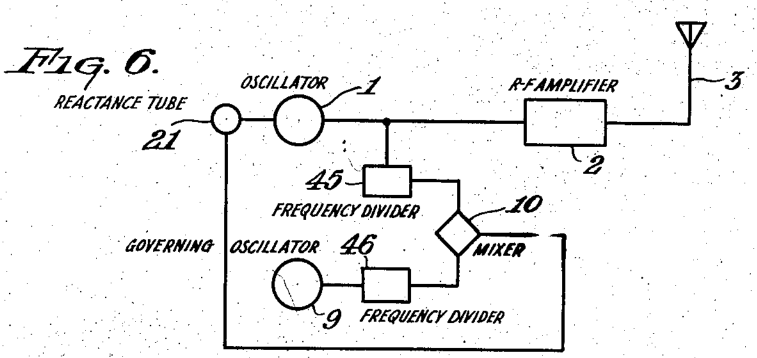

Figs. 4, 5 and 6 illustrate some applications of the circuit arrangement according to the invention, in which the parts corresponding with those of the circuit-arrangement of Fig. 1 are designated by the same reference numerals.

In the circuit arrangement shown in Fig. 4, the voltage supplied together with the governing voltage originating from oscillator 9, to the mixing circuit 10 is obtained by mixing in a mixing circuit 36 the oscillation generated by transmitting oscillator 1 and an auxiliary oscillation generated by an oscillator 35. Use is preferably made of an auxiliary oscillator 35 which is adjustable in steps, whereas the oscillator 9 is adjustable continuously, as a result of which the transmitting oscillator 1 can be accurately adjusted to a definite frequency within a control range of appreciable width.

An application for receiving purposes is illustrated in Fig. 5. In this case the oscillations collected in an aerial 36 are converted in a mixing stage 37, together with the oscillation generated by a local oscillator 38, into an intermediate-frequency oscillation which is supplied to an intermediate-frequency amplifier 39. Subsequently, the intermediate-frequency oscillations are demodulated in a detector 40 and supplied to a reproducing device 41. In order to bring the frequency of the intermediate frequency oscillations precisely in conformity with the tuning frequency of the intermediate-frequency amplifier 39, the oscillations are supplied, together with governing oscillations generated by a governing oscillator 42, to a mixing circuit 43 according to the invention, the output voltage of which is supplied to a reactance circuit which controls the frequency of the local oscillator 38.

Fig. 6 shows a circuit arangement for transmitting purposes. In this case a harmonic or a subharmonic is derived from the transmitting oscillator 1 by means of a frequency-divider or multiplier 45, a harmonic or a subharmonic of other order being derived from the governing oscillator 9 by means of a frequency-divider or multiplier 46. According to the invention, these harmonics are brought in conformity with one another by means of a mixing circuit 10 and a reactance circuit 21, which is coupled with the transmitting oscillator 1.

Figure 7:
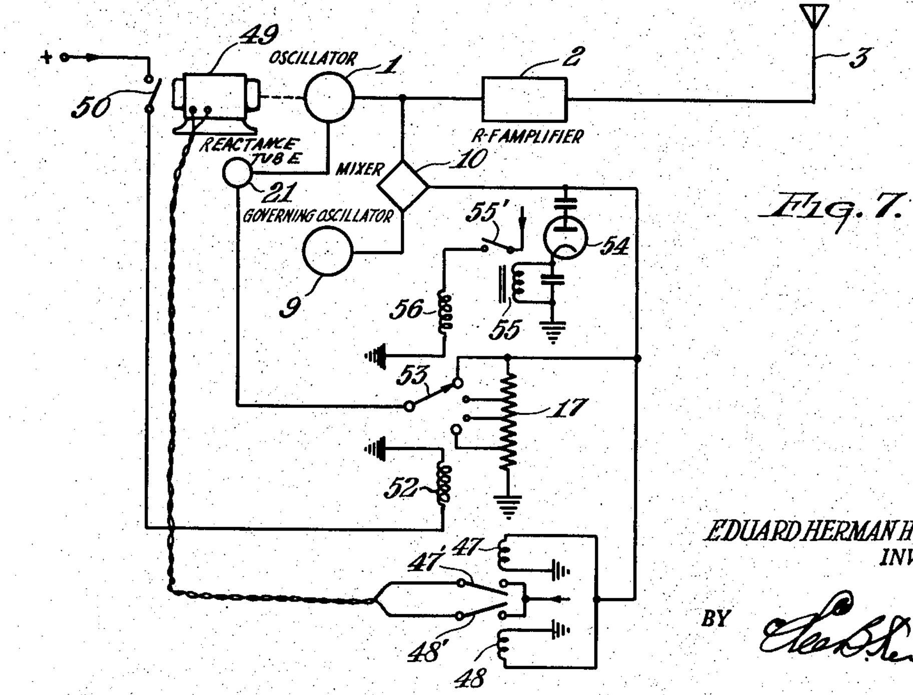

The circuit arrangement previously described exhibit the phenomenon that if the control circuit drops out, for example owing to breakdown of the mixing tube, the frequency of the oscillations generated by the transmitting oscillator is determined again by the tuning frequency of the circuit 5 (Fig. 1) and may thus materially deviate from the frequency desired. This is avoidable by using in the devices referred to not only the frequency modulator 21 operating with backsetting force, but also a device without backsetting force for controlling the tuning frequency of the transmitting oscillator 1. For this purpose use may, on principle, be made of devices of known type. Fig. 7 represents an improved form of construction of a device according to the invention.

In the circuit arrangement shown in Fig. 7, the output voltage taken from the mixing circuit 10 and set up at the resistance 17 is supplied not only to the reactance circuit 21 but also to two polar relays 47 and 48. If the direct voltage across resistance 17 exceeds a minimum value determined by the sensitivity of the relay, the relay contacts 47′ or 48′, according to polarity, will be closed with the result that a motor 49 starts rotating either in the right-hand or in the left-hand sense. This motor controls the tuning circuit of the transmitting oscillator, for example, by adjusting the tuning condenser of the circuit 5 (Fig. 1) in such a manner that the tuning frequency of the transmitting oscillator and the governing frequency are approached. Consequently, the frequency difference compensated by the frequency modulator 21 and the direct voltage taken from the mixing circuit 10 gradually decrease until the energized polar relay 47 or 48 is eventually de-energized and the motor stops.

If, thereupon, the control circuit drops out, the frequency of the transmitting oscillator will vary to a less extent than it would be the case without the presence of the motor 49 operating without backsetting force.

A further improvement is obtained by using sensitivity control of the control circuit, since, if the motor relay 47, 48 is de-energized and the motor 49 stops, the energizing circuit 51 of an auxiliary relay 52 may be closed by a contact 50 actuated by the armature of the motor. This auxiliary relay controls a step-switch 53, owing to which part of the voltage set up across the output resistance 17, instead of the entire voltage, is supplied to the reactance circuit. As a result of this voltage division the phase displacement between the voltage of the transmitting oscillator and the governing voltage will adjust itself so that the reactance circuit has supplied to it the same governing voltage as prior to the voltage division, since the frequency difference to be corrected is not influenced by the voltage division. Now, however, the voltage set up at the output resistance 17 is higher than before the voltage division, as a result of which the motor 49 is started again and the frequency difference compensated by the frequency modulator is reduced again. By the use of a plurality of tappings of the output resistance 17 the remaining frequency difference to be compensated by the frequency modulator 21 may be decreased stepwise at will and, thus, the variation of the frequency of the transmitting oscillator may be reduced to a minimum when the control circuit drops out.

With a decreased sensitivity of the control circuit it may occur that upon variation of the tuning of the governing oscillator the frequency difference to be compensated falls outside the range within which synchronisation is possible (range of collection). In this case an alternating voltage determined by the frequency difference is active as the output voltage of the mixing circuit. This alternating voltage is used to neutralize the decrease in sensitivity. For this purpose a diode rectifier 54 is connected with the output circuit of the mixing circuit. The rectified voltage energizes a relay 55 which energizes, with the aid of the contact 35', a relay 56 governing the step switch 53. The step switch is thus brought into such a position that the full output voltage set up at the resistance 17 is supplied to the reactance circuit 21.

For varying the sensitivity of the control circuit use may be made of a device other than the adjustable voltage divider. For example, the control range of the control device may be reduced by interposition of a second frequency modulator which brings about a smaller frequency variation for each volt of the control voltage than the first-mentioned frequency modulator.

What I claim is:

1. Apparatus for stabilizing the phase and frequency of an oscillator producing an oscillatory wave subject to fluctuation comprising a voltage-responsive frequency control device coupled to said oscillator and operable to vary the frequency thereof in either direction, an auxiliary oscillator for producing an auxiliary wave, means to mix said auxiliary wave with the oscillatory wave yielded by said oscillator to produce an intermediate wave, a reference wave generator, a phase detector for producing a beat voltage whose frequency depends on the frequency difference between two applied waves and a direct voltage whose value depends upon the phase displacement between two applied waves of the same frequency, means to apply said intermediate wave and said reference wave to said phase detector, and means to impress the resultant output voltage of said phase detector on said control device to control the phase and frequency of said oscillator in accordance therewith.

2. Apparatus for stabilizing the phase and frequency of an oscillator producing an oscillatory wave subject to fluctuation comprising a voltage-responsive frequency control device coupled to said oscillator and operable to vary the frequency thereof in either direction, an auxiliary oscillator for producing an auxiliary wave and adjustable in a stepwise manner throughout a given frequency range, means to mix said auxiliary wave with the oscillatory wave yielded by said oscillator to produce an intermediate wave, a reference wave generator continuously adjustable throughout a predetermined range, a phase detector for producing a beat voltage whose frequency depends on the frequency difference between two applied waves and a direct voltage whose value depends upon the phase displacement between two applied waves of the same frequency, means to apply said intermediate wave and said reference wave to said phase detector, and means to impress the resultant output voltage of said phase detector on said control device to control the phase and frequency of said oscillator in accordance therewith.

3. Apparatus for stabilizing the phase and frequency of a controlled oscillator producing an oscillatory wave subject to fluctuation and including a frequency-determining resonant circuit, said apparatus comprising a voltage-responsive electronic reactance tube coupled to the resonant circuit of said oscillator and operable to vary the frequency thereof in either direction within a predetermined range of variation, an auxiliary oscillator for producing an auxiliary wave, a mixer coupled to said controlled oscillator and said auxiliary oscillator to produce an intermediate wave, a reference wave generator, a phase detector for producing a beat voltage whose frequency depends on the frequency difference between two applied waves of different frequency and a direct voltage whose value depends on the phase displacement of two applied waves of the same frequency, said detector including an electron discharge device provided with a cathode, first and second grids and an anode, and a non-inductive output impedance directly connected to the anode of said device, means to apply the intermediate wave from said mixer to one of said grids and to apply the reference wave from said generator to the other of said grids, and means to impress the resultant output voltage across said output impedance as a control voltage on said reactance tube.

4. Apparatus for stabilizing the phase and frequency of a controlled oscillator producing an auxiliary wave subject to fluctuation and including a frequency determining resonant circuit, said apparatus comprising a voltage-responsive electronic reactance tube coupled to the resonant circuit of said oscillator and operable to vary the frequency thereof in either direction within a predetermined range of variation, an auxiliary oscillator for producing an auxiliary wave and adjustable in a stepwise manner throughout a predetermined range, a mixer coupled to said oscillator and said auxiliary oscillator to produce an intermediate wave, a reference wave generator continuously adjustable throughout a predetermined range, a phase detector for producing a beat voltage whose frequency depends on the frequency difference between two applied waves of different frequency and a direct voltage whose value depends on the phase displacement of two applied waves of the same frequency, said detector including an electron discharge device provided with a cathode, first and second grids and an anode, and a non-inductive output impedance directly connected to the anode of said device, means to apply the intermediate wave from said mixer to one of said grids and to apply the reference wave from said generator to the other of said grids, and means to impress the resultant output voltage across said output impedance as a control voltage on said reactance tube.

EDUARD HERMAN HUGENHOLTZ.

REFERENCES CITED

The following references are of record in the file of this patent:

UNITED STATES PATENTS

| Number | Name | Date |
|---|---|---|
| 2,066,528 | Harper | Jan. 5, 1937 |
| 2,209,507 | Campbell | July 30, 1940 |
| 2,273,771 | Hunt | Feb. 17, 1942 |
| 2,280,525 | Hunt | Apr. 21, 1942 |
| 2,332,540 | Travis | Oct. 26, 1943 |
| 2,335,265 | Dodington | Nov. 30, 1943 |
| 2,340,432 | Schock | Feb. 1, 1944 |
| 2,343,263 | Okrent | Mar. 7, 1944 |
| 2,368,052 | Unger | Jan. 23, 1945 |
| 2,379,689 | Crosby | July 3, 1945 |
| 2,450,019 | Ranger | Sept. 28, 1948 |